Figure 1:
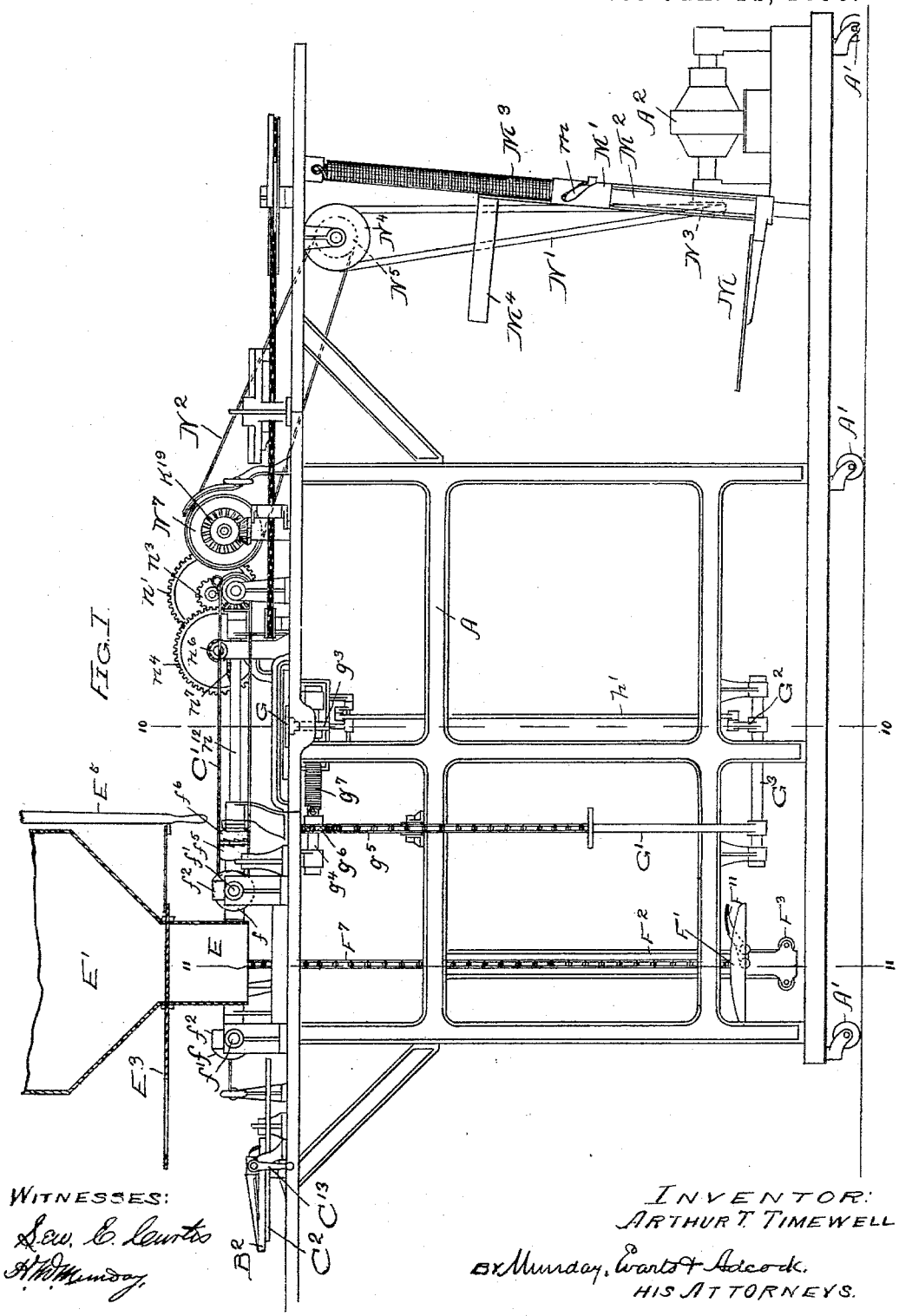

(No Model.) 12 Sheets—Sheet 1.

A. T. TIMEWELL.
SACK FILLING AND SEWING MACHINE.

No. 597,075. Patented Jan. 11, 1898.

WITNESSES:
Geo. E. Curtis
H. W. Munday

INVENTOR:
ARTHUR T. TIMEWELL
By Munday, Evarts & Adcock.
HIS ATTORNEYS.

(No Model.) 12 Sheets—Sheet 2.

A. T. TIMEWELL.
SACK FILLING AND SEWING MACHINE.

No. 597,075. Patented Jan. 11, 1898.

FIG. 2.

WITNESSES:
Geo. E. Curtis
H. W. Munday

INVENTOR:
Arthur T. Timewell
By Munday, Evarts & Adcock.
HIS ATTORNEYS.

(No Model.) 12 Sheets—Sheet 3.

A. T. TIMEWELL.
SACK FILLING AND SEWING MACHINE.

No. 597,075. Patented Jan. 11, 1898.

WITNESSES:
Geo. E. Curtis
H. W. Munday

INVENTOR:
ARTHUR T. TIMEWELL
BY Munday, Evarts & Adcock.
HIS ATTORNEYS.

(No Model.) 12 Sheets—Sheet 4.
A. T. TIMEWELL.
SACK FILLING AND SEWING MACHINE.
No. 597,075. Patented Jan. 11, 1898.
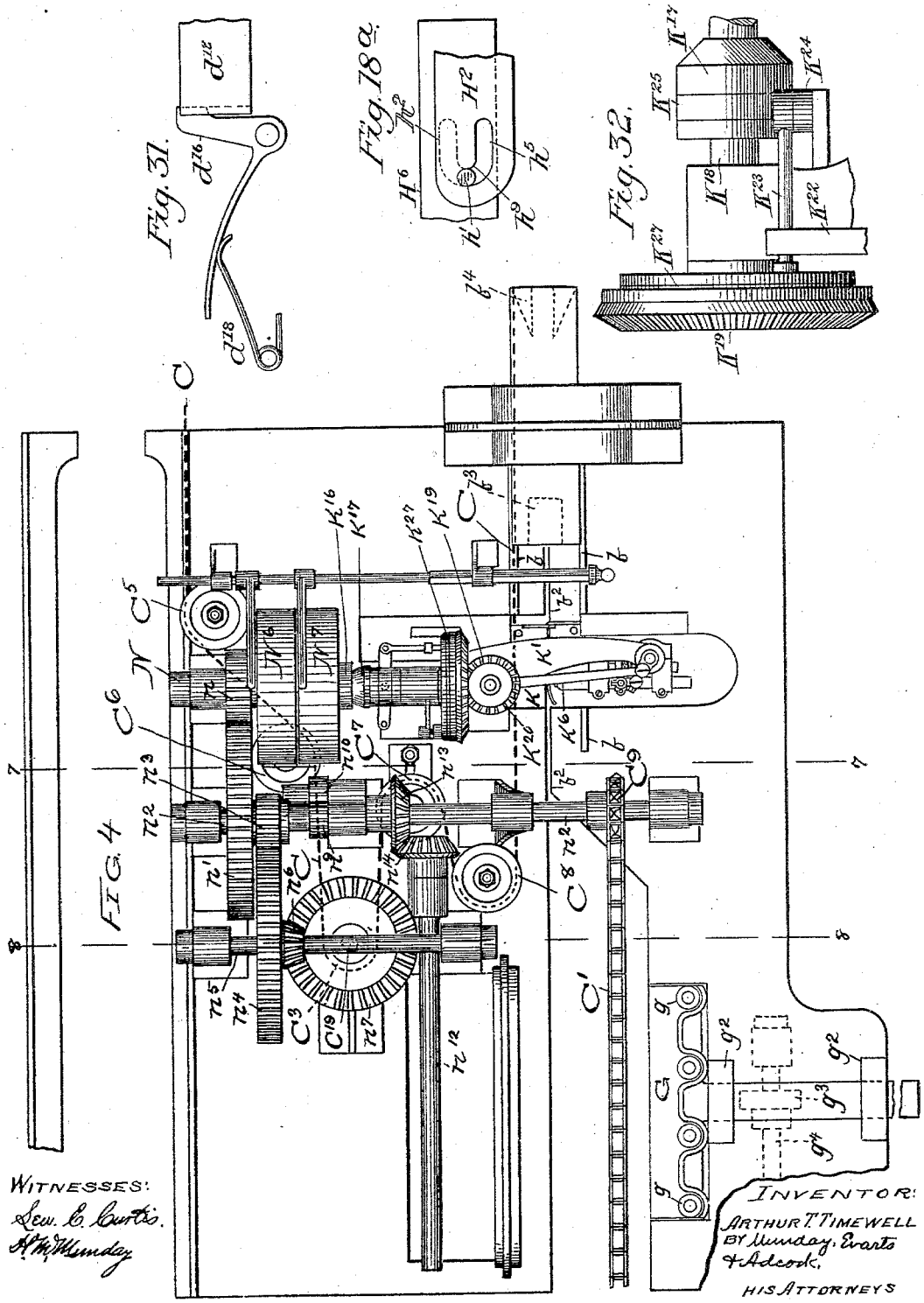
WITNESSES:
Geo. E. Curtis.
H. M. Munday.
INVENTOR:
Arthur T. Timewell
By Munday, Evarts
& Adcock.
HIS ATTORNEYS (No Model.)
A. T. TIMEWELL.
SACK FILLING AND SEWING MACHINE.
No. 597,075. Patented Jan. 11, 1898.
12 Sheets—Sheet 5.
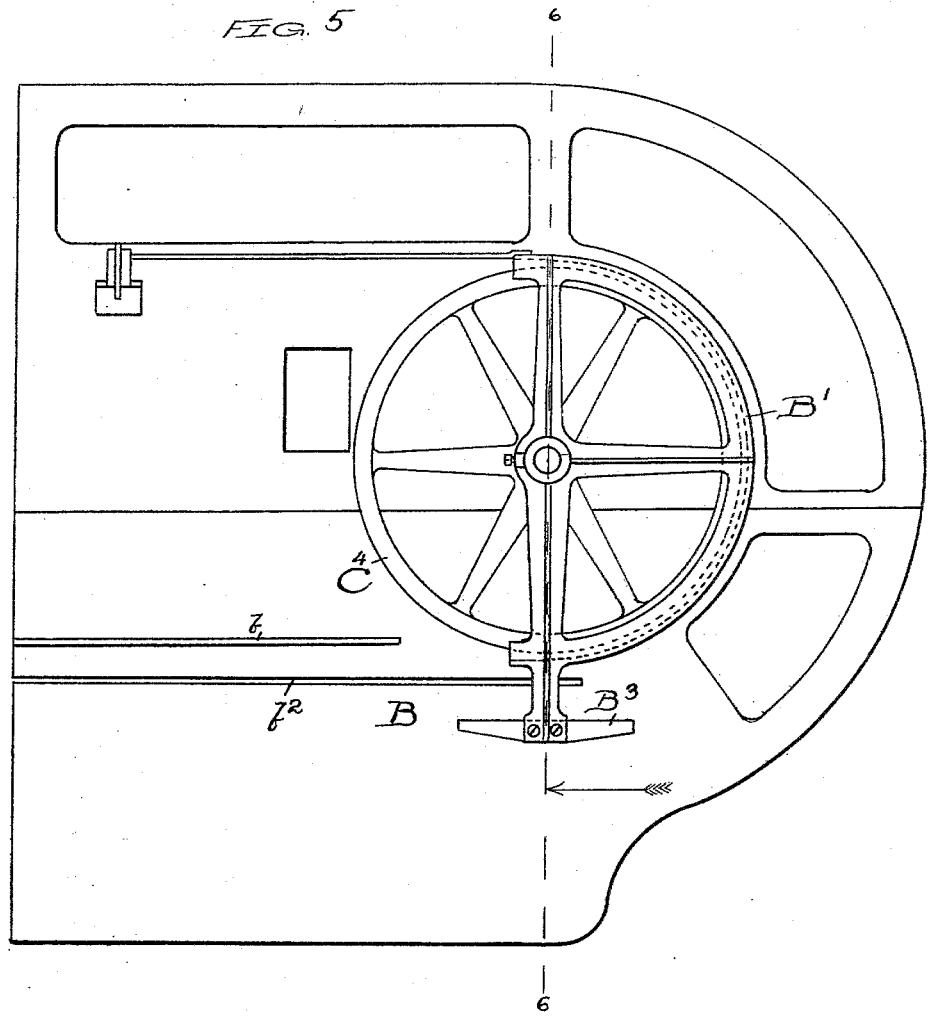
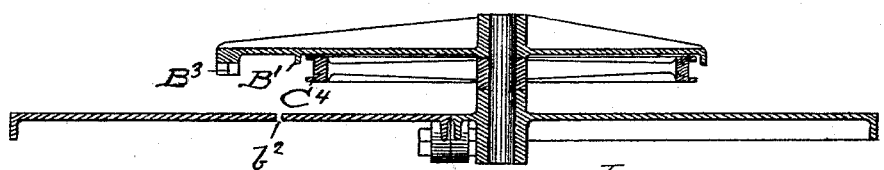
WITNESSES:
Sew. E. Curtis
H. W. Munday
INVENTOR:
ARTHUR T. TIMEWELL
By Munday, Evarts & Adcock,
HIS ATTORNEYS.

(No Model.) 12 Sheets—Sheet 6.
A. T. TIMEWELL.
SACK FILLING AND SEWING MACHINE.
No. 597,075. Patented Jan. 11, 1898.
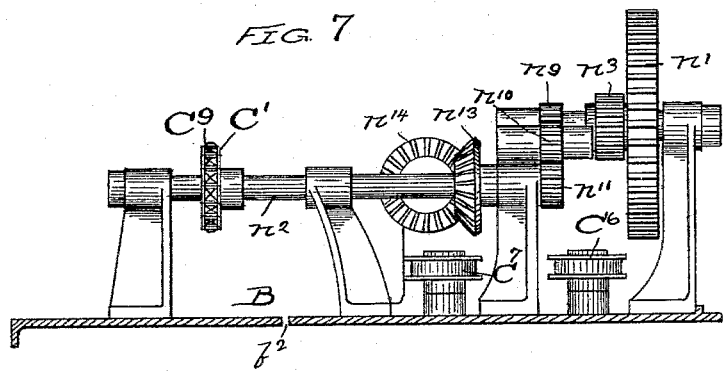
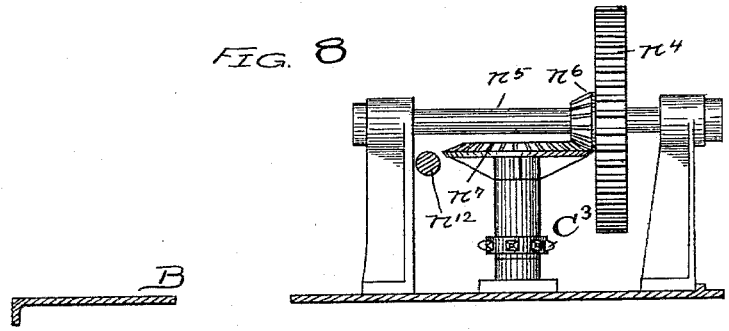
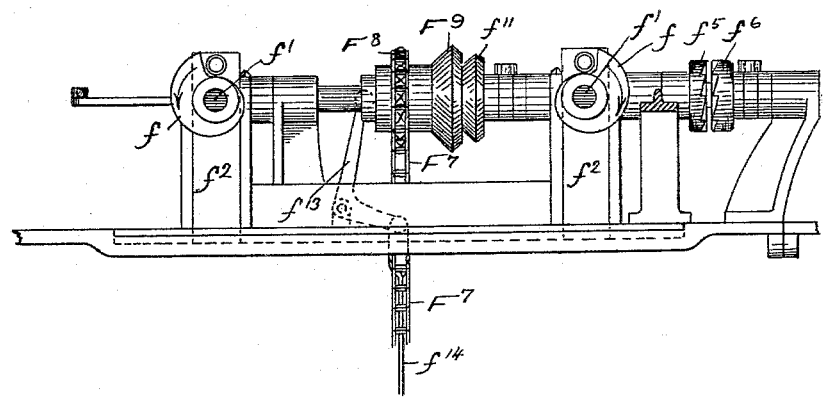

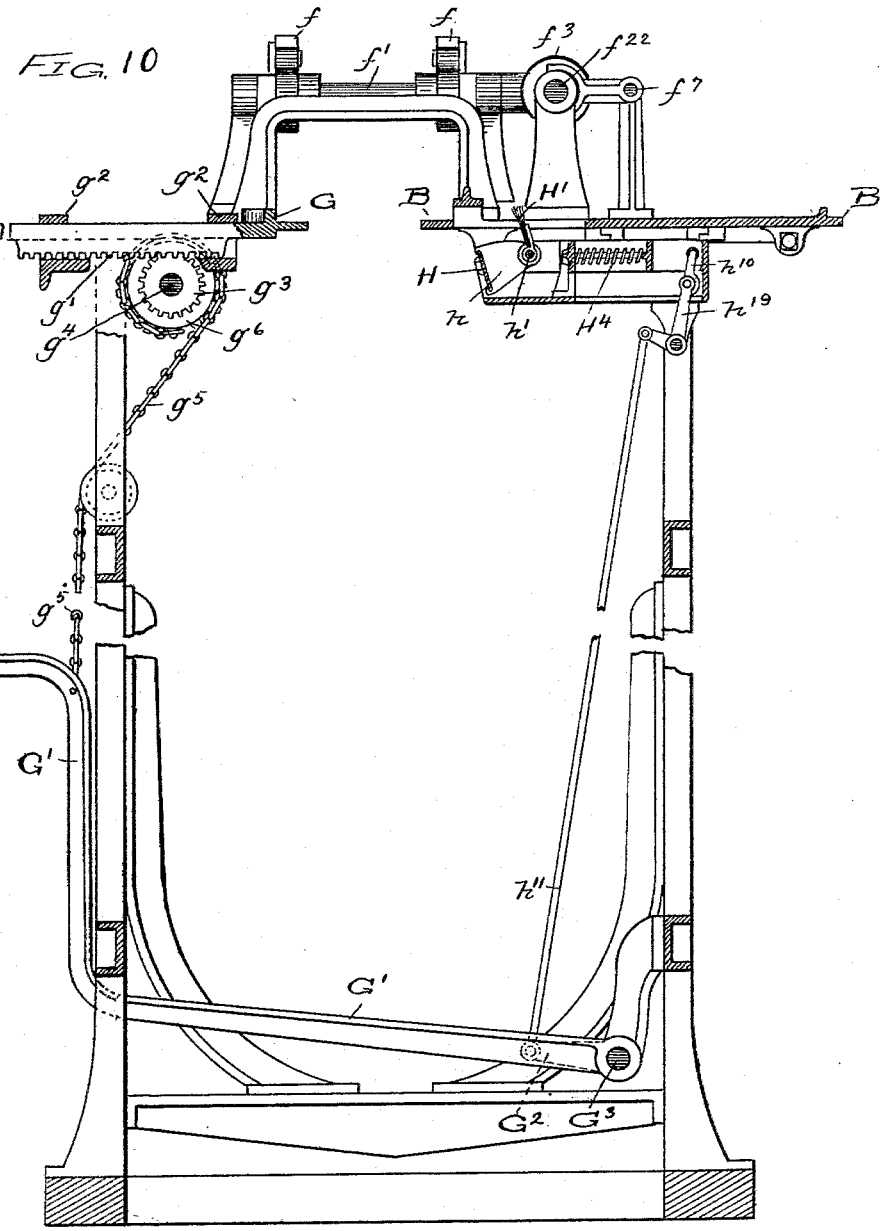

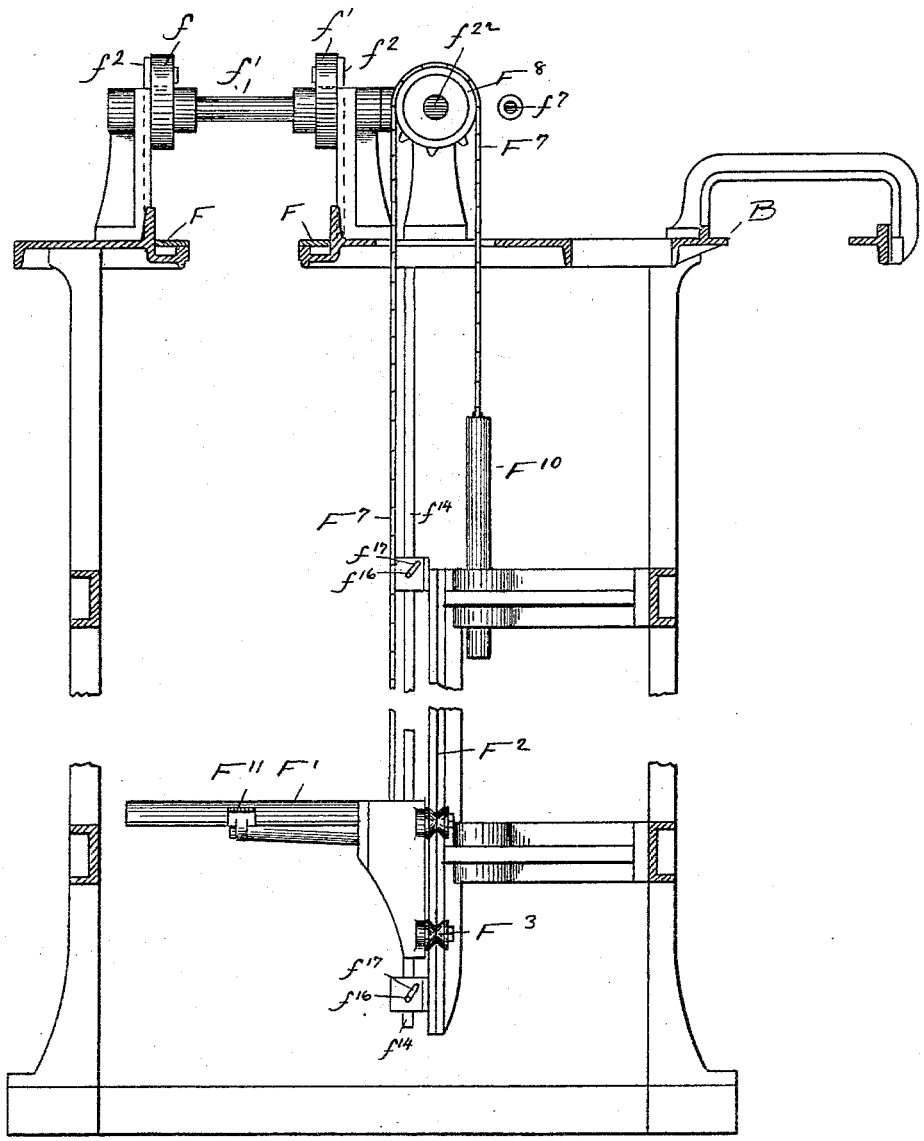

(No Model.) 12 Sheets—Sheet 9.
A. T. TIMEWELL.
SACK FILLING AND SEWING MACHINE.
No. 597,075. Patented Jan. 11, 1898.
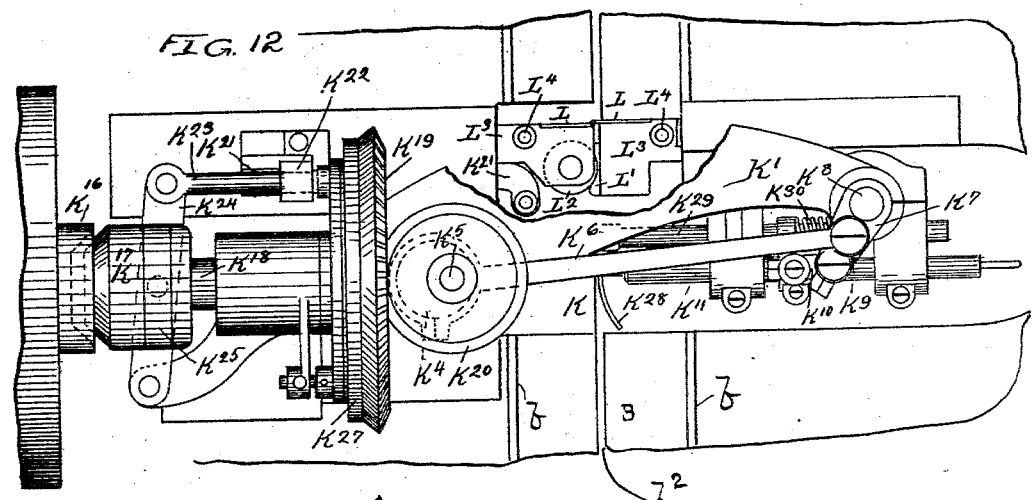
FIG. 12
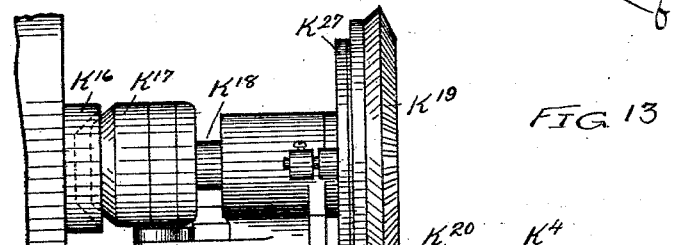
FIG. 13
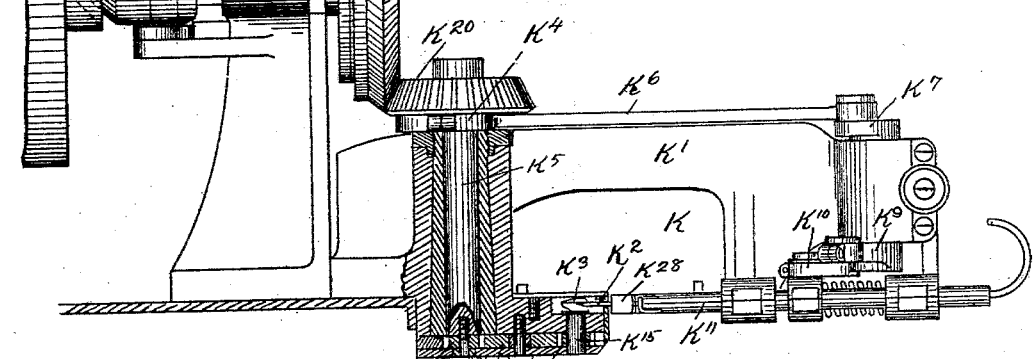
FIG. 14
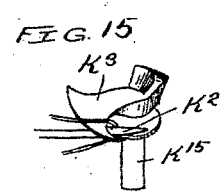
FIG. 15
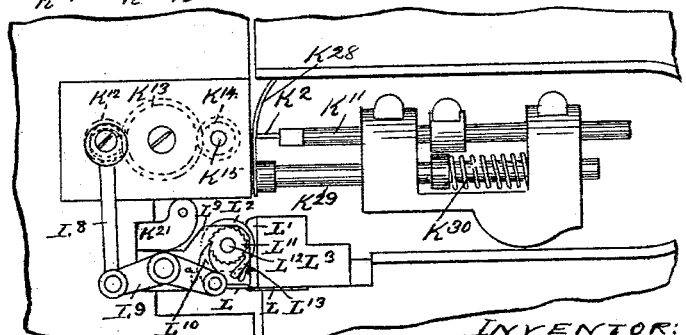
WITNESSES:
Geo. E. Curtis
H. W. Munday
INVENTOR:
ARTHUR T. TIMEWELL
by Munday, Evarts & Adcock
HIS ATTORNEYS.
THE NORRIS PETERS CO., PHOTO-LITHO., WASHINGTON, D. C.

(No Model.) 12 Sheets—Sheet 10.
A. T. TIMEWELL.
SACK FILLING AND SEWING MACHINE.
No. 597,075. Patented Jan. 11, 1898.
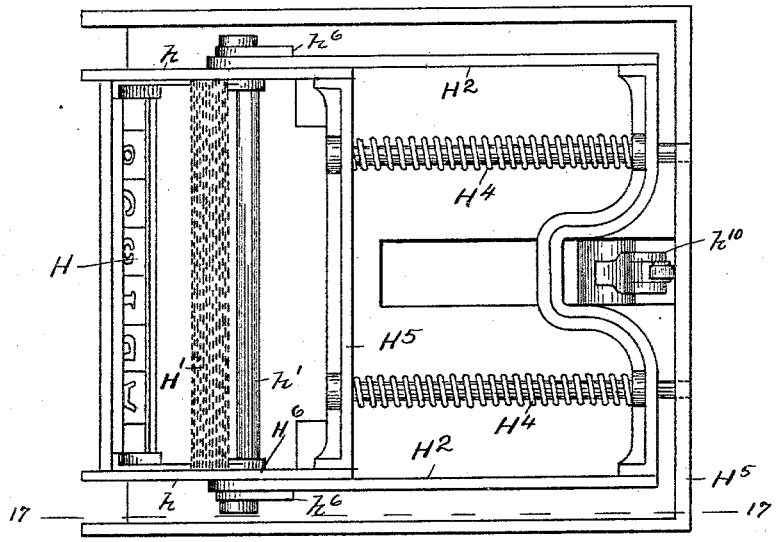
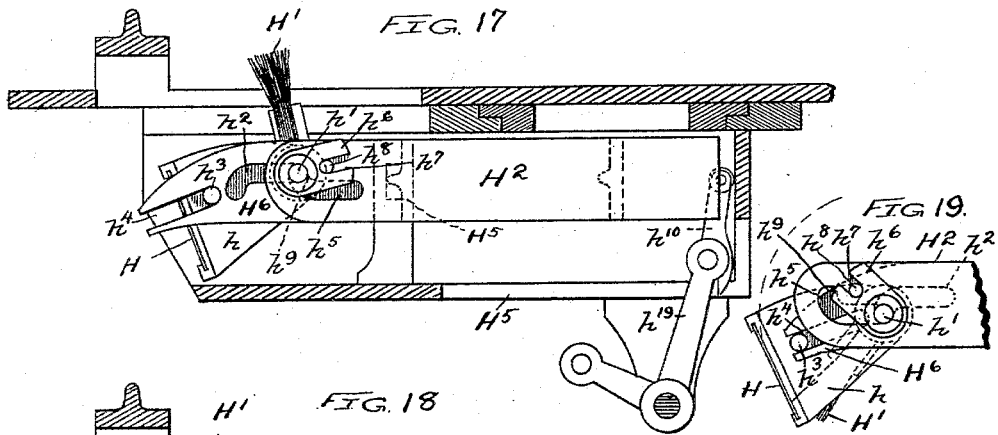
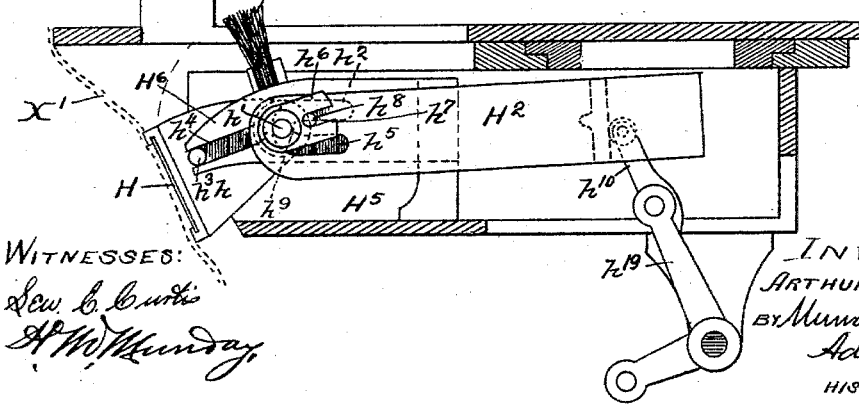
WITNESSES:
INVENTOR:
ARTHUR T. TIMEWELL
BY Munday, Evarts & Adcock.
HIS ATTORNEYS.

(No Model.) 12 Sheets—Sheet 11.
A. T. TIMEWELL.
SACK FILLING AND SEWING MACHINE.
No. 597,075. Patented Jan. 11, 1898.
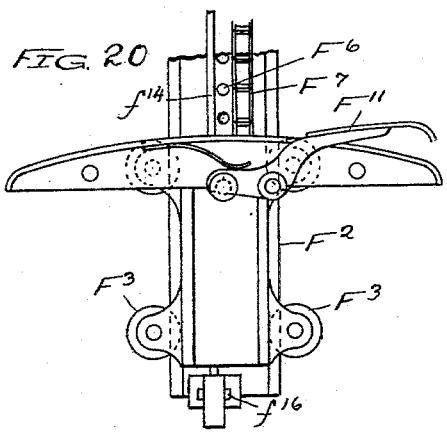
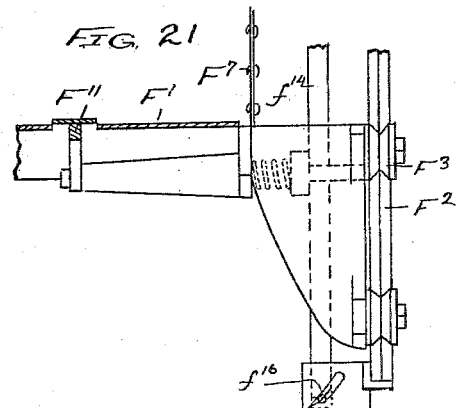
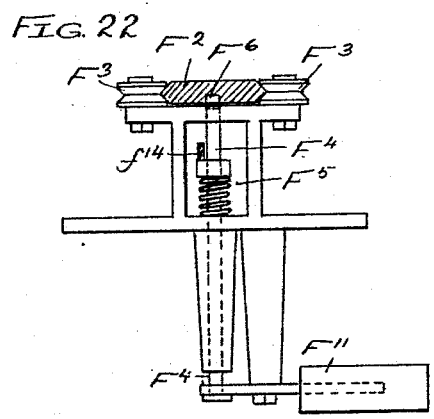
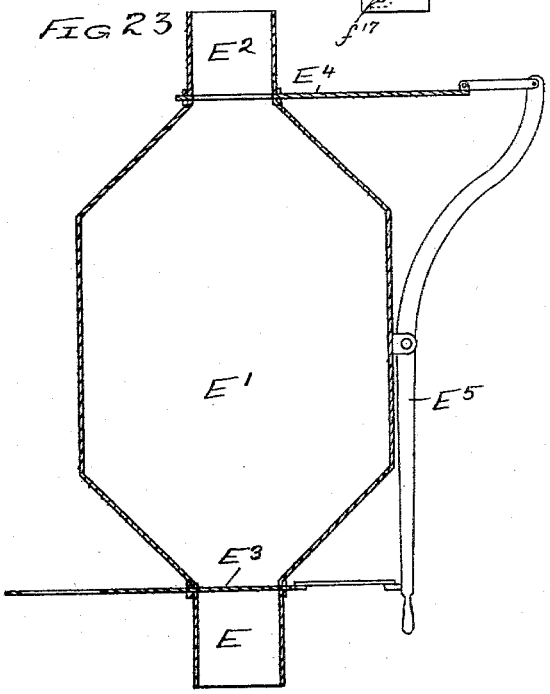
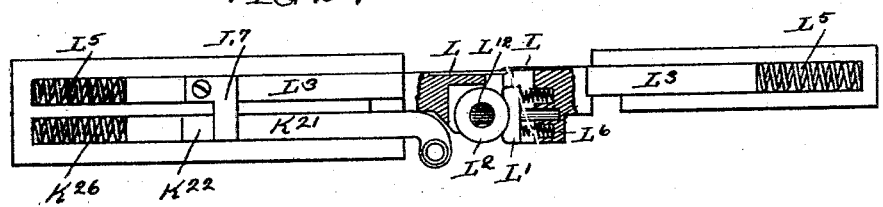
WITNESSES:
Sew. E. Curtis
H. W. Munday
INVENTOR:
ARTHUR T. TIMEWELL
by Munday, Evarts & Adcock.
HIS ATTORNEYS.
THE NORRIS PETERS CO., PHOTO-LITHO., WASHINGTON, D. C.

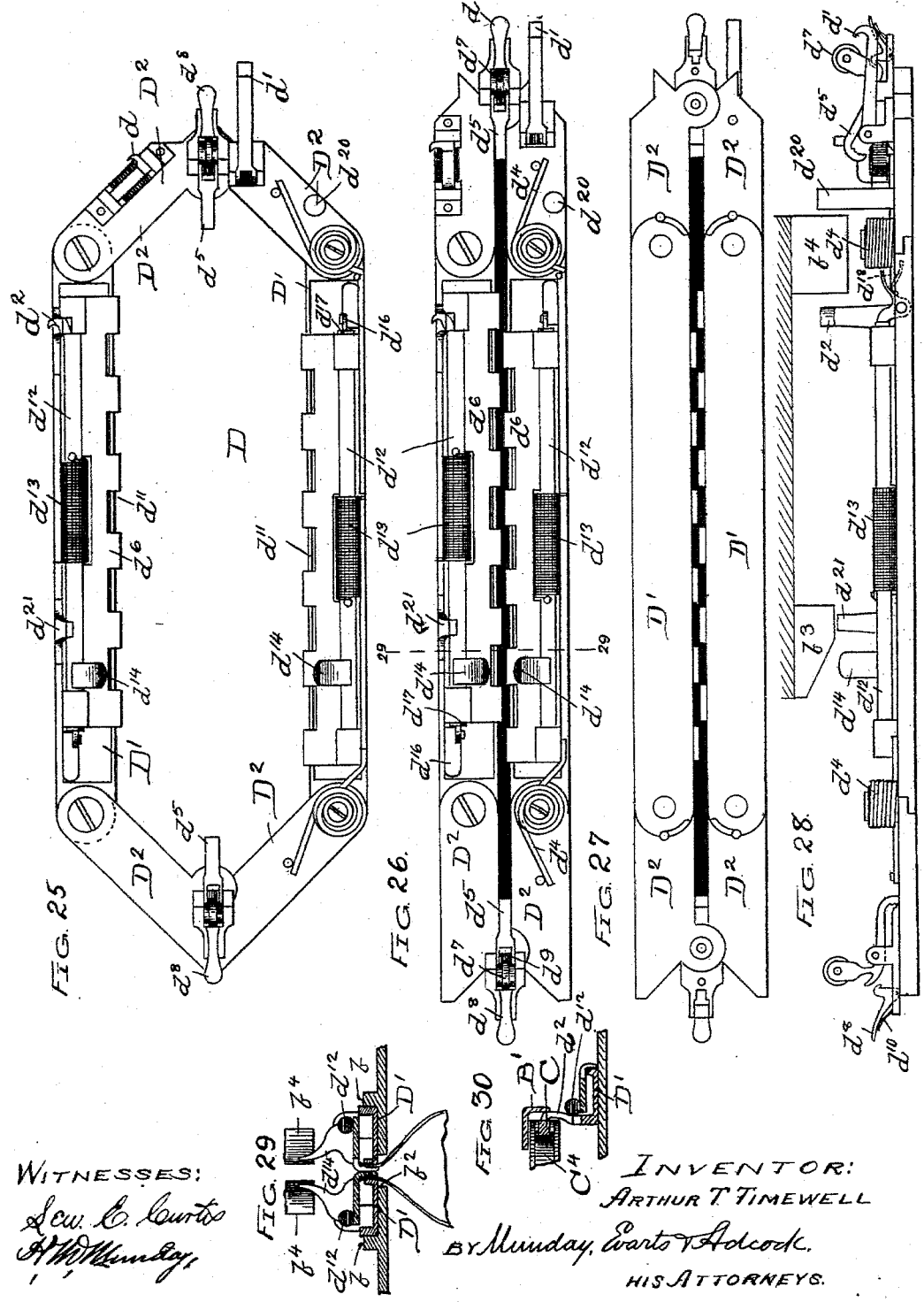

UNITED STATES PATENT OFFICE.

ARTHUR T. TIMEWELL, OF CHICAGO, ILLINOIS, ASSIGNOR TO ALBERT DICKINSON, OF SAME PLACE.

SACK FILLING AND SEWING MACHINE.

SPECIFICATION forming part of Letters Patent No. 597,075, dated January 11, 1898.

Application filed February 8, 1896. Serial No. 578,620. (No model.)

*To all whom it may concern:*

Be it known that I, ARTHUR T. TIMEWELL, a citizen of the United States, residing in Chicago, in the county of Cook and State of Illinois, have invented a new and useful Improvement in Sack Filling and Sewing Machines, of which the following is a specification.

My invention relates to improvements in machines for filling sacks or bags with various materials and sewing up the mouths of such sacks or bags after they are filled; and my invention relates more particularly to improvements upon the sack filling and sewing machines shown and described in my Letters Patent No. 539,455, of May 21, 1895, and in my pending application, Serial No. 541,865, filed March 15, 1895.

My present invention or improvement consists, in connection with a bag-filling mechanism, of a sewing mechanism, a series of opening and closing movable sack-holders, an endless recurring-track upon which the holders travel to convey the sacks or bags from the filling-station to the sewing-station and to the discharging and receiving stations, and an up-and-down movable bag-shaking device engaging the sack-holder, so as to shake the sack from its mouth or top edge, of a movable bumper or support adapted to strike or engage the sack at its lower end in order that the material in the sack may be settled, compacted, or compressed simultaneously from both the upper and lower ends of the bag. I find by experiment and practice that by combining with the filling mechanism and other parts a shaker that operates to move the bag-holder up and down, and thus shakes and stretches the sack from its mouth or top edge, and a bumper or support for the lower end of the sack to rest upon or strike against as it is being shaken or lifted up and down by the shaker at the top, the material in the sack may be much more rapidly and perfectly settled and compacted in the bag.

Another feature of my present invention consists in combining with the movable bag-holders the track upon which they travel, the chain or other mechanism for propelling the holders along the track, and the sewing device or mechanism, a thread-holding device provided with a feed device or mechanism for the thread, which feed device is set in operation by the sewing mechanism itself or simultaneously with the sewing mechanism, and a friction-clutch or equivalent mechanism for gradually setting in operation or communicating motion to the sewing mechanism, whereby the necessity for suddenly stopping and starting the sewing mechanism and of having it positively geared to start and stop at fixed intervals in respect to the movement of the bag-holder along its track and in respect to the opening and closing of the thread-holder is obviated. By this means I materially add to the durability of the machine and also cause it to run much more smoothly and easily and without shock or strain to the sewing mechanism.

Another feature of my invention consists, in connection with the filling mechanism and sewing mechanism, in the series of opening and closing sack-holders and the track and mechanism for moving them along the track, in providing a short guide or guard along the track, which is engaged by a pin projecting from each of the holders near the front end thereof for the purpose of compressing or keeping the holder closed at its front end until its rear end emerges from the guide-flanges of the track, which hold the holder closed, thus preventing the front end of the holder from slightly opening and letting the filled sack sag down before fully reaching the position for discharging the sack.

My invention also consists in the novel construction of parts and devices and in the novel combinations of parts and devices herein shown and described, and more particularly specified in the claims.

In the accompanying drawings, forming a part of this specification, and in which similar letters of reference indicate like parts throughout all the figures, I have shown one construction and which I believe to be the best construction of machine now known to me for reducing my invention to practice.

Figure 3:
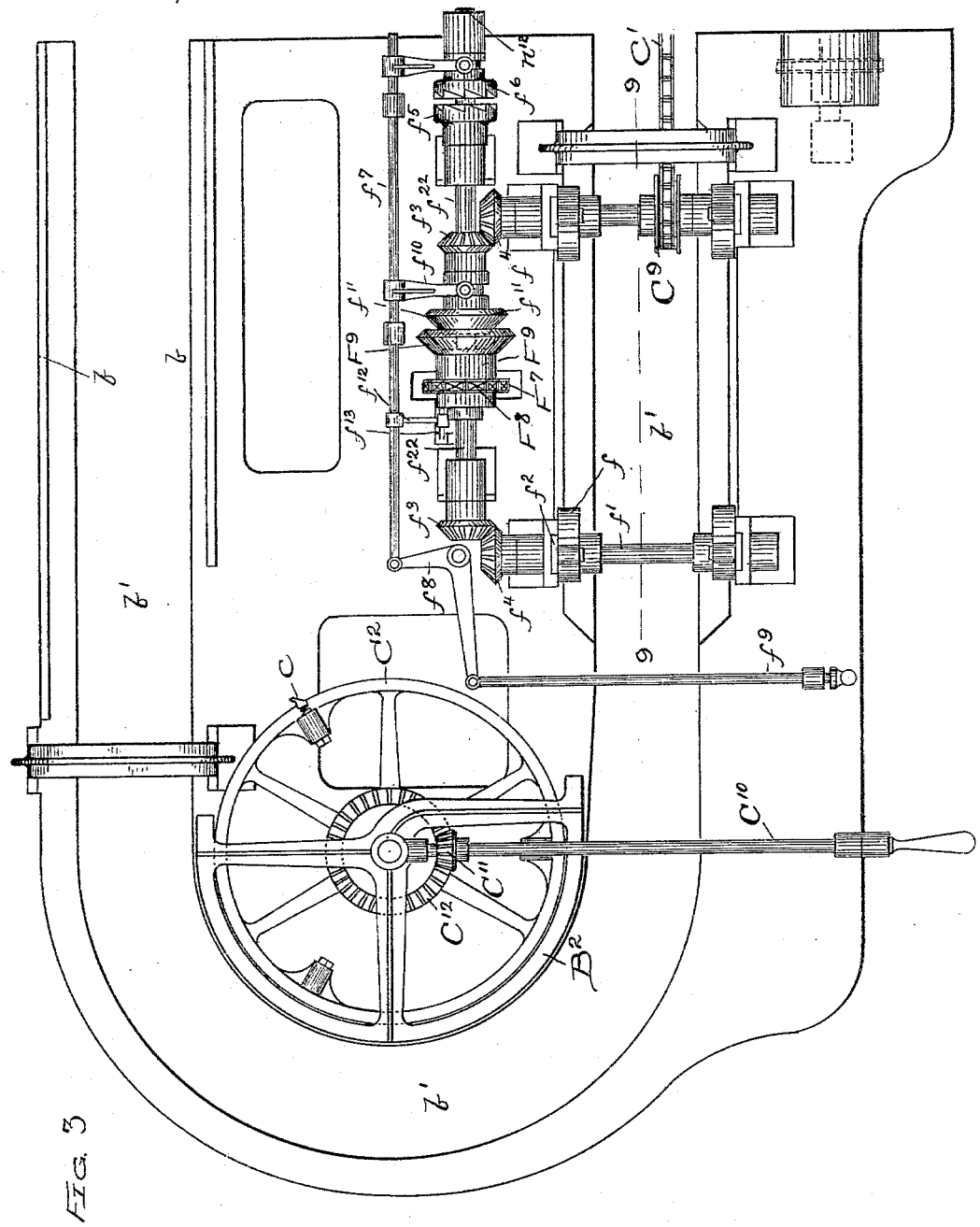

In the drawings, Figure 1 is a side elevation of a machine embodying my invention, the filling device or mechanism being shown in vertical section. Fig. 2 is a plan view. Fig. 3 is an enlarged plan view of the lefthand end or portion of the machine. Fig. 4 is an enlarged plan view of the middle portion of the machine, and Fig. 5 is an enlarged plan view of the right-hand portion of the machine. Figs. 3, 4, and 5, taken together, represent an enlarged plan of the whole machine. Fig. 6 is a vertical section on the line 6 6 of Fig. 5. Figs. 7 and 8 are vertical sections on the lines 7 7 and 8 8, respectively, of Fig. 4. Fig. 9 is a detail elevation of the friction-clutch and mechanism for communicating motion to the shaker and to the bumper. Figs. 10 and 11 are vertical sections on the lines 10 10 and 11 11, respectively, of Fig. 1. Fig. 12 is an enlarged detail plan view of the sewing mechanism or device and the thread holding and cutting mechanism or device. Fig. 13 is an enlarged elevation of the sewing mechanism, partly in section. Fig. 14 is a detail plan view of the sewing mechanism, showing also the mechanism for communicating motion to the feed device with which the thread-holder is provided. Fig. 15 is a detail view of the looper. Fig. 16 is a detail plan view of the stencil-printing device with which the machine is provided for marking the sacks. Fig. 17 is a section on the line 17 17 of Fig. 16. Fig. 18 is a view similar to Fig. 17, showing the parts in another position. Fig. $18^a$ is a detail view of parts shown in Fig. 18. Fig. 19 is a detail plan view of certain parts shown in Figs. 17 and 18 in still another position. Figs. 20, 21, and 22 are detail views of the bumper and the mechanism for operating the same. Fig. 23 is a detail vertical section of the filling mechanism or device. Fig. 24 is a longitudinal section showing in detail the thread cutting and holding device and the thread-feeder with which the holder is provided. Figs. 25, 26, 27, and 28 are detail views of the opening and closing traveling sack-holder. Fig. 29 is a detail vertical section of the holder, showing the stationary cams for operating the clamps on the holder. Fig. 30 is a detail vertical section showing the guard or device for keeping the hook or projection on the holder in engagement with the carrier or chain at the curved portion of the track. Fig. 31 is a detail view of parts hereinafter to be described, and Fig. 32 is a detail view of the clutch mechanism of the sewing device.

In the drawings, A represents the frame of the machine, and A' are wheels or casters upon which the frame is mounted to adapt it to be moved about on the dock or warehouse where the machine is used to bring it in position for connection with various elevator-spouts or other spouts or bins from which the material to be sacked is to be delivered to the machine.

$A^2$ is an electric or other motor mounted on the movable frame of the machine for supplying the power necessary for driving it in the different positions where it may be placed.

B is an endless recurring-track on the frame of the machine, along which the series of opening and closing movable sack-holders D D are moved or conveyed from the sack filling and measuring device E, shaker F, and bumper F' to the sack-closing device G and printing device H, thence to the sewing device K, thence to the discharging device M, thence to the sack-receiving station X, and finally back again to the filling device. Along this track B the movable sack-holders are conveyed, preferably by a number of separate conveyers or moving devices adapted to engage the holders, the same being preferably a power-driven endless conveyer or chain C, a supplemental power-driven endless conveyer or chain C', and a hand-operated conveyer or wheel $C^2$.

The track B is furnished with side guides or flanges $b$ $b$, projecting upward from the track and adapted to engage the two opposite side edges of the holders and thus keep the same closed, these guides or flanges having a space between them equal to the width of the holder when it is closed. The track B is also furnished with a wide slot or open space $b'$, extending from the sack-receiving station X, where the holder is open to the device for closing the holder, and with a narrow slot $b^2$, extending from the position where the holder is closed to the position where it is again opened to discharge the filled and sewed sack. The guides or flanges $b$ $b$ preferably extend only part way of the track B—that is to say, along that portion of the track where the holder is held closed by said guides or flanges and along the portion of the track at the sack-receiving station X to guide the movement of the open holder along the track when it is being moved by the hand of the operator who puts the sack into the holder from the point where it is released by the conveyer C to the point where it is again engaged by the conveyer $C^2$. By thus making the track B plain or without guides or flanges for the holder at the curved portions of said track I obviate all danger of accident from the holders binding on the guides as they are being conveyed or from one holder injuriously jamming against another.

The conveyer C, by which the series of holders D are moved along the track B from the holder-closing device G to the sack-receiving station X, consists, preferably, of an endless-link chain traveling around the driving sprocket wheel or pulley $C^3$, the large sprocket wheel or pulley $C^4$ at the right-hand end of the machine, and the intermediate or idler pulleys $C^5$ $C^6$ $C^7$ $C^8$. Each of the holders D is provided on its inner side near its front end with hooks or projections $d$ $d^2$, adapted to engage the links of the chain conveyer C along that portion of the track where the path of the chain C coincides with the path of the holder or track B.

From the sack-filling position to the sack-closing position the series of holders D are conveyed or moved along the track B by the supplemental conveyer C', which is also preferably an endless-link chain and travels upon the sprocket wheels or pulleys $C^9$ $C^9$, located above the track B, the links of which are engaged by a hinged or pivoted hook $d'$, with which each of the holders D is provided at or near its front end and which hook the operator lifts into engagement with the chain $C'$ after the sack has been filled and the material settled or compacted therein by the shaker F and bumper $F'$.

To hold the hook or projection $d^2$ in proper engagement with the chain or conveyer C at the curved portion of the track or where the chain C passes around the pulley $C^4$, I provide a guide or guard $B'$, extending around the outer half-circle of the pulley $C^4$, there being a sufficient slot or space between this curved guard $B'$ and the conveyer-chain on the pulley $C^4$ to accommodate or give room for the hook or projection $d^2$ on the sack-holder D.

The supplemental hand-operated conveyer $C^2$ is preferably made in the form of a wheel, and it is furnished with a hook, pin, or projection $c$ on its periphery, which engages the pin or projection $d^2$ on the holder, and thus conveys the holder around to a position near the sack-filling station. To keep the pin $d^2$ of the holder in engagement with the pin $c$ on the conveyer C, a guard $B^2$, extending around the outer periphery of the wheel $C^2$, is provided.

Each of the holders D comprises two opposite side or long bars $D'$ $D'$ and four short or end bars $D^2$ $D^2$ $D^2$ $D^2$, the six bars being hinged together at their ends, so that the holder may be opened and closed. One or more springs $d^4$ at one or more of the pivots of the holder serves to automatically throw it open. Each of the holders is provided with clamping-jaws $d^5$ $d^5$ at its opposite ends and with clamping-jaws $d^6$ $d^6$ at its sides. The pivoted clamping-jaws $d^5$ $d^5$ are each provided with friction-rollers $d^7$, adapted to engage, respectively, the stationary cams or projections $b^3$ $b^3$, overhanging the track B, and thus automatically open these clamping-jaws when the holder reaches the position for discharging the filled and sewed sack. Each of the clamping-jaws $d^5$ is also provided with a pivoted pawl or latch $d^8$ to hold the clamping-jaw open against the pressure of the spring $d^9$, by which the clamping-jaw is held closed. The latch $d^8$ is furnished with a spring $d^{10}$ to hold it in position for engaging the clamping-jaw $d^5$ when it is open. Each of the clamping-jaws $d^6$ consists of a long sectional blade having notches $d^{11}$ at intervals, secured to a rock-shaft $d^{12}$, which has a torsion-spring $d^{13}$ to hold the clamping-jaw closed. Each of the rock-shafts $d^{12}$ is furnished with an upwardly-projecting arm $d^{14}$, by which the clamping-jaw is opened and which is adapted to engage a stationary cam or projection $b^4$, (see Fig. 29,) overhanging the track B, and thus open the clamping-jaw $d^6$ when the holder reaches the position for discharging the filled and sewed sack. A pivoted pawl or latch $d^{16}$ engages a notch or projection $d^{17}$ on the rock-shaft of the clamping-jaw to hold it open, the pawl or latch $d^{16}$ being provided with a spring $d^{18}$.

To prevent the holder from beginning to open at its front end before reaching the position for discharging the sack, I provide a short guide or guard $B^3$, overhanging the track B, and which is engaged by a pin or projection $d^{20}$ near the front end of the holder. When the pin $d^{20}$ on the holder passes the guide or guard $B^3$, the rear end of the holder simultaneously emerges from between the side guides $b$ $b$ of the track B, so that the holder is free to be thrown open by its springs $d^4$ $d^4$ simultaneously at both ends. As long as the rear half or more of the holder remains between the side guides $b$ $b$ of the track B these side guides alone will efficiently operate to keep the holder closed, and when the holder advances somewhat farther along the track B the pin $d^{20}$ near the front end of the holder will engage the short guide or guard $B^3$, so that the holder will now be held closed at both ends, at the rear end by the side guides $b$ $b$ and at the front end by the short guide $B^3$ engaging the pin $d^{20}$.

The pin or projection $d$ on the holder which first engages the chain carrier C is located on the front short arm $D^2$ of the holder adjacent to the chain carrier C, so that when the holder is shut from its open position to its closed position the mere act of thus closing the holder will throw this pin or projection $d$ into engagement with the conveyer C, and thus cause the holder to begin to move forward the moment it is closed. As the holder is thus advanced along by the conveyer C its second pin or projection $d^2$, which is located on the long side bar $D'$ of the holder, comes also into engagement with the conveyer-chain C. The moment the holder reaches the sack-discharging position and is allowed to be thrown open by having passed the side guides $b$ $b$ and the short guard $B^3$ the pin or hook $d$ on the short arm $D^2$ of the holder is automatically withdrawn from the conveyer C by the mere act of the holder opening, so that only one of the pins or hooks—viz., the pin or hook $d^2$—will pass between the curved guard $B'$ and the conveyer-chain C as it passes around the pulley $C^4$. This prevents any danger of interference or binding as the holder is conveyed around the curved portion of the track. A pin or projection $d^{21}$ on the holder prevents the holder from swinging under the line of the carrier-chain or the pulley $C^4$ by engaging the outer surface of the curved guard $B'$.

As the holder D is in its open position when it is moved along the track B into engagement with the carrier-wheel $C^2$, it is only the pin $d^2$ on the side bar $D'$ that engages the projection $c$ on the carrier-wheel $C^2$, and the pin $d^{21}$, in connection with the curved guard $B^2$, performs the same function at this end of the machine that it does in connection with the curved guard $B'$ at the other end of the machine.

E is the filling device or spout through or by which the grain or other material is filled into the sack.

The measuring device by which the quantity of material supplied to each sack is gaged or determined may be of any suitable kind and operated to measure either by weight or by bulk. I prefer, however, to employ a bulk-measuring device, as shown in the drawings. It comprises a measuring-chamber $E'$, equal in capacity to that of the bag, a receiving-spout $E^2$, and two valves $E^3$ $E^4$, the upper one separating the measuring-chamber from the receiving-spout and the lower one separating the measuring-chamber from the filling-spout E. These valves are alternately opened and closed by a lever $E^5$.

The shaker F, which operates to shake the sack from its mouth or upper edge by moving the sack-holder itself up and down, is vibrated by revolving cams $f$ $f$ on the shafts $f'$ $f'$ through the connecting straps or hangers $f^2$ $f^2$.

The bumper $F'$, against which the lower end of the sack strikes as it is being shook or lifted up and down by the shaker F, consists, preferably, of an up-and-down movable platform or support. It reciprocates up and down on a suitable guide $F^2$, the bumper being preferably provided with antifriction wheels or rollers $F^3$ to engage the upright guide $F^2$. The bumper $F'$ is raised to any required height and then locked or fixed in this position, so that the bottom of the bag will properly strike against it as it is being filled from the spout E and moved up and down by the shaker F. It is thus fixed or locked in position by a latch or locking-pin $F^4$, actuated by a spring $F^5$, engaging one of a series of holes $F^6$ in the upright guide $F^2$. It is lifted to the required height by a chain or connection $F^7$, which passes over the pulley $F^8$ on the sleeve $F^9$. A weight $F^{10}$ is connected to the chain $F^7$, which partially compensates for the weight of the bumper and enables it to be more easily lifted into position for operation. The bumper F is provided with a trip $F^{11}$, which is engaged by the bottom of the sack, so that the weight of the sack and its contents against this trip as the bumper is being raised up will move this trip and thus release the spring-actuated latch or locking-pin $F^4$, and thus permit it to engage one of the holes in the guide $F^2$ and thereby prevent further movement of the bumper $F'$. As the trip-lever $F^{11}$ is thus operated by the weight itself of the sack being filled the bumper will be automatically stopped or fixed in proper position for properly bumping or engaging the sack, whatever may be the precise length of the sack or the precise point at which the mouth of the sack is clamped in the holder D. This feature is one of value in the practical operation of the machine, as the sacks always vary more or less in length, and because, even if the sacks were all of the same length, the operator would unavoidably fix the mouths of the bags in the holders at more or less varying points.

Motion is communicated to the shafts $f'$ $f'$, by which the shaker F is operated from the shaft $f^{22}$ through the bevel-gears $f^3$ $f^3$ thereon, engaging bevel-gears $f^4$ $f^4$ on the shaker-operating shafts $f'$ $f'$. The shaft $f^{22}$ has fixed to it a clutch $f^5$, and it is thrown in gear with the shaft $n$ by a clutch-sleeve $f^6$, which is operated by a clutch-rod $f^7$ through the lever $f^8$ and a handle-bar or pull-rod $f^9$. The clutch-rod $f^7$ is also furnished with an arm $f^{10}$, that operates a sliding friction clutch-sleeve $f^{11}$, which engages the friction clutch-sleeve $F^9$, to which the pulley or sprocket wheel $F^8$ of the bumper-operating chain is secured. As the clutch $f^5$ $f^6$ is a toothed clutch and the clutch $f^{11}$ $F^9$ a friction-clutch, the teeth of the clutch $f^5$ $f^6$ will permit, after coming in engagement with each other, a sufficient further movement of the clutch-rod $f^7$ to bring the parts of the friction-clutch into operative engagement. It will thus be seen that the operator by the first movement of the clutch-rod $f^7$ throws the shaker F into operation, and that the further movement of the same clutch-rod throws the friction clutch-sleeves $f^{11}$ $F^9$ into engagement with each other, and thus causes the bumper $F'$ to be raised up against the lower end of the bag being filled until the weight of the contents of the bag against the trip $F^{11}$ causes the trip to move and thus releases the latch or locking pin $F^4$, when the bumper will be fixed thereby to the stationary guide $F^2$. As power is communicated to the bumper-raising mechanism through a friction-clutch controlled by the clutch-lever in the hand of the operator, the operator can, by exerting greater or less force upon the clutch-lever, cause the bumper to begin to be raised at any time desired as he feels the weight of the contents of the bag being filled, and as the bumper is being lifted the operator can at any moment desired allow the weight of the bag and its contents to overcome the friction between the faces of the friction-clutch $f^{11}$ $F^9$. By this means, in connection with the trip $F^{11}$, the position of the bumper is always under the control of the operator. After the bag has been filled and its contents sufficiently settled and compacted by the operation of the shaker from above and the bumper from below the operator moves the clutch-lever and the clutch-rod in the opposite direction and thus throws the shaker-driving shaft $f^{22}$ out of gear, and an arm $f^{12}$ on the clutch-rod $f^7$ engages a lever $f^{13}$, (see Fig. 9,) that operates a sliding bar $f^{14}$, furnished with pins $f^{16}$ $f^{16}$, that fit in inclined slots or cams $f^{17}$ $f^{17}$ on the stationary frame of the machine, so that this bar engaging the catch or locking-pin $F^4$ will thus retract the same and permit the bumper to descend by its own weight. (See Figs. 21 and 22.) The counterbalance $F^{10}$ is made somewhat lighter than the bumper, so that the bumper will descend by its own weight after its locking-pin is released from the guide $F^2$.

The closer G or device for closing the sack-holder D consists, preferably, of a reciprocating slide furnished with antifriction-rollers $g$ to bear against one of the long bars $D'$ of the holder. The slide G is reciprocated in its guides $g^2$ on the frame of the machine by means of a rack $g'$, Fig. 10, which is engaged by a gear $g^3$ on the shaft $g^4$, which is operated by a chain $g^5$, passing around and secured to a sprocket-wheel $g^6$, and which chain is attached to and operated by a treadle or lever $G'$. A spring $g^7$, Fig. 1, preferably a torsional spring, surrounding the shaft $g^4$ retracts the closing device G after the holder is closed and is conveyed beyond the closer and between the two side guides $b\ b$ of the track B.

Owing to the rough, coarse, fibrous fabric of which sacks or bags are usually made and to the more or less irregular surface presented to the printing device by the sack and to the more or less irregular and yielding nature of the support afforded by the contents of the filled bag against the pressure of the printing device, I have found that it adds greatly to the success and efficiency of the machine as a whole to combine with the other parts a printing device that operates in the nature of a stencil.

The stencil-printing device of the machine comprises a stencil H, mounted upon a reciprocating and slightly-rocking head or holder $h$, which is carried by and pivoted to a reciprocating shaft $h'$, carrying the ink-applying brush $H'$. The brush-shaft $h'$ reciprocates bodily back and forth in a guide $h^2$. The stencil head or holder $h$ is furnished with pins $h^3$, that reciprocate in a guide $h^4$. A reciprocating slide $H^2$, engaging the brush-carrying shaft $h'$, moves said shaft and the stencil holder or head $h$ backward and forward in their respective guides $h^2\ h^4$. The reciprocating slide $H^2$ is furnished with a slot $h^5$, with a curved end or shoulder $h^9$ at its end, where it engages the brush-shaft $h'$, and the brush-shaft $h'$ is provided with arms $h^6\ h^6$, having slots $h^7$, that engage pins $h^8$ on the slide $H^2$. Springs $H^4$ are inserted between the slide $H^2$ and the stationary frame or box $H^5$, to which the plates $H^6$ are secured. The guides $h^2\ h^4$ are formed in or secured to the stationary plates $H^6$. When the slide $H^2$ is reciprocated or moved forward, it pushes forward the brush-shaft $h'$ and the stencil-holder $h$ until the stencil is pressed against the bag $X'$, as shown in Fig. 18, and until the brush-shaft $h'$ reaches the limit of its forward movement and rests in the curved extremity of the slot $h^2$, as shown in Figs. 18 and $18^a$, this being done by reason of the curve or shoulder $h^9$ in the slot $h^5$ in the slide $H^2$, which engages the shaft $h'$ and moves it forward. The further forward movement of the slide $H^2$ causes the brush-shaft $h'$, which now rests in the curved extremity of the guide or slot $h^2$ and thus prevented from further forward movement, to rotate on its axis by reason of the arm $h^6$ on said brush-shaft $h'$ engaging the pin $h^8$ on said slide $H^2$, thus swinging or wiping the ink-carrying brush over the stencil and marking the bag by reason of the rotation of the brush-shaft $h'$. The wiping movement of the brush over the stencil is repeated when the brush and its shaft makes its backward oscillation on the return movement of the slide $H^2$. By this means I am enabled to print or mark upon the bag the requisite characters or data plainly and distinctly. The slide $H^2$ is operated by a lever $h^{19}$, furnished with a spring held or yielding pivoted arm $h^{10}$, and which lever is connected to an arm $G^2$ on the shaft $G^3$ of the treadle $G'$ by a connecting-link $h^{11}$.

The sewing device or mechanism K comprises, preferably, a frame or arm $K'$, attached to the frame A at one side of the track B and overhanging said track, a reciprocating needle $K^2$, and a revolving looper $K^3$. The needle is reciprocated by an eccentric or cam $K^4$ on the shaft $K^5$ through the pitman-rod $K^6$, which is connected to an arm $K^7$ on the rock-shaft $K^8$, which has another arm $K^9$, connected by a link $K^{10}$ with the slide $K^{11}$, to which the needle $K^2$ is attached. The looper $K^3$ is revolved by a gear $K^{12}$ on the shaft $K^5$ through the intermediate gear $K^{13}$, that meshes with the gear $K^{14}$ on the shaft $K^{15}$ of the looper. The shaft $K^5$ of the sewing device is driven from the shaft N through a friction-clutch $K^{16}\ K^{17}$, the sliding clutch-sleeve $K^{17}$ being on the shaft $K^{18}$, which has a bevel-gear $K^{19}$, which meshes with a bevel-gear $K^{20}$ on the shaft $K^5$. The clutch-sleeve $K^{17}$ is operated to put the sewing mechanism in gear by a slide $K^{21}$, which projects in the path of the holder D as it moves along the track B. This slide operates the clutch-sleeve through suitable connecting mechanism, the same consisting, preferably, of an arm $K^{22}$ on the slide $K^{21}$, a connecting-link $K^{23}$, and a lever $K^{24}$, which is pivoted to a collar $K^{25}$ on the clutch-sleeve $K^{17}$. A spring $K^{26}$, Fig. 24, moves the clutch-sleeve $K^{17}$ in the opposite direction to throw the sewing mechanism out of gear when the holder D passes beyond the slide $K^{21}$. A friction-brake $K^{27}$ engages the rear face of the bevel-gear $K^{19}$ to stop the motion or momentum of the sewing mechanism as soon as the clutch $K^{17}$ is thrown out of gear. This friction-brake is connected to the clutch-operating lever by the link $K^{28}$, so that the brake is released the moment the clutch is thrown in gear.

$K^{28}$ is the presser-foot. Its stem $K^{29}$ is furnished with a spring $K^{30}$.

The thread-cutter L L, Fig. 24, consists of a pair of reciprocating knives, and the thread-holder consists of a shoe or jaw $L'$ and a revoluble thread-feed wheel $L^2$, which is geared to the sewing mechanism, so as to revolve and permit the thread to feed as long as the sewing mechanism is in gear. This causes the thread or chain to be fed or taken up as long as the sewing mechanism is running and prevents entangling of the thread with the looper or other parts and obviates danger of breaking the thread or needle. The thread-cutter knives and the thread-holder devices are mounted upon reciprocating slides $L^3$ $L^3$, which are furnished with pins or rollers $L^4$ $L^4$, which engage the holder D, so that the holder as it passes along will separate these slides and permit them to be closed by their springs $L^5$ $L^5$ when the holder passes. The thread-holding shoe or jaw $L'$ is supported on independent springs $L^6$ on the slide $L^3$, so that it may have a yielding pressure against the thread holder and feeding roller $L^2$.

In order to prevent the slide $K^{21}$ from closing or moving back to throw the sewing mechanism out of gear until the thread cutter and holder slides $L^3$ $L^3$ can close, I provide the slide $L^3$ with a projection $L^7$, that engages the arm $K^{22}$ on the slide $K^{21}$, and thus prevents said slide $K^{21}$ closing in advance of the slide $L^3$. Any suitable mechanism may be employed to gear the thread feeding and holding roller $L^2$ to or with the sewing mechanism. The means I prefer to employ is shown in the drawings and consists of an eccentric on the sewing-mechanism-driving shaft $K^5$, which, through a pitman or connecting-link $L^8$, operates a lever $L^9$, carrying a pawl $L^{10}$, that engages a ratchet-wheel $L^{11}$ on the shaft $L^{12}$ of the roller $L^2$. $L^{13}$ is a locking-pawl, also engaging this ratchet $L^{11}$. By this means the requisite feed movement may be communicated to the thread or chain-stitch holding and feeding roller $L^2$.

The filled and sewed sack discharging device M consists, preferably, of an inclined revolving spring-supported platform. This platform M is attached to a sliding and rotatable sleeve $M'$ on the inclined shaft $M^2$, the sleeve being supported by a spiral spring $M^3$, surrounding the inclined shaft. A spiral groove $m$ in the sleeve causes it to rotate as it reciprocates downward on the rod under the weight of the sack when it is dropped upon it by the opening of the holder D. When the spring retracts, it returns the platform to position to receive another sack. $M^4$ is an arm to guide or hold the upper end of the sack until it is swung around and discharged.

N is the main driving-shaft of the machine. Motion is communicated to it from the motor $A^2$ on the frame of the machine through the belts $N'$ $N^2$ and pulleys $N^3$, $N^4$, $N^5$, $N^6$, and $N^7$, pulley $N^6$ being a loose pulley on the driving-shaft and the pulley $N^7$ the driving-pulley. Motion is communicated from the driving-pulley $C^9$ to the shaft $C^{19}$ of the driving-pulley $C^3$ of the chain conveyer C by means of the gear $n$ on the driving-shaft N meshing with the gear $n'$ on the counter-shaft $n^2$, which carries a small gear $n^3$, that meshes with a gear $n^4$ on the shaft $n^5$, which carries a bevel-gear $n^6$, that meshes with a bevel-gear $n^7$ on the shaft $C^{19}$ of said conveyer-driving pulley $C^3$. Motion is communicated from the shaft $n^2$ to the counter-shaft $n^9$ through the spur-gears $n^9$ $n^{10}$ $n^{11}$. Motion is communicated from the shaft $n^2$ to the shaft $n^{12}$, carrying the clutch $f^6$ for driving the shaker-operating shaft $f^2$, by means of a bevel-gear $n^{13}$ on said shaft $n^2$, which meshes with a bevel-gear $n^{14}$ on said shaft $n^{12}$. One of the pulleys $C^9$ of the supplemental conveyer $C'$ is secured to this same counter-shaft $n^2$ and is thus driven continuously.

Motion is communicated to the sewing mechanism K, as before described, through the friction-clutch $K^{16}$ $K^{17}$, one member of which is carried by the driving-shaft N.

The supplemental conveyer or wheel $C^2$ is preferably operated by hand, this being conveniently done by means of a shaft $C^{10}$, and carrying a bevel-gear $C^{11}$, that engages a bevel-gear $C^{12}$ on the shaft of the conveyer $C^2$. It is operated by a crank $C^{13}$.

It will be observed that in my present improvement, wherein a frictional or yielding connection or frictional clutch is interposed in the mechanism for communicating motion to the sewing mechanism from and by the movement of the traveling sack-holder, the sewing mechanism is stopped and started gradually and without sudden shock or danger of injury to the mechanism or interference with its regular operation. In order to practically combine such frictional clutch or yielding connection with the other parts and prevent danger of breaking the needle by engagement with the sack in cases where the frictional or yielding connection in the sewing-machine-driving mechanism should leave the needle projecting across the path of the sack or of the next sack in the succeeding holder when the sewing mechanism stops, I so arrange and combine the parts that the sewing mechanism is set into motion and its needle into vibration some little time before the sack reaches the needle and so that it will continue in motion some little time after the sack passes the needle. By this means all possibility of the needle being broken by engagement therewith of the sack in the moving sack-holder is obviated, and to take up the surplus chain or stitching thus formed and projecting beyond the sack as fast as it is formed I provide the thread or chain holder with a revolving roller or feed device. This prevents the projecting chain or stitching from becoming entangled or interfering with the operation of the machine or needle.

I claim—

1. In a sack filling and sewing machine, the combination with a series of movable opening and closing sack-holders, an endless recurring track for the holders, a sack-filling device, a movable shaker or device for vibrating the holder up and down, a movable bumper or support to engage the lower end of the sack to settle and compact the contents of the sack in connection with said shaker, a device for closing the holder, a sewing device, a thread-holder furnished with a thread-feed device, a conveyer for moving the holders along said track from the closing device to the sack-receiving station, a supplemental conveyer for moving the holders along said track from the filling device to the closing device, and a third conveyer for moving the holders along said track from the sack-receiving station to the filling device, substantially as specified.

2. In a sack filling and sewing machine, the combination with a sewing device of a movable opening and closing sack-holder, a track for the holder, a sack-filling device or spout, a movable shaker or device for vibrating the holder up and down to shake the sack, and a movable bumper or support to engage the lower end of the sack to settle and compact the contents of the sack in connection with said shaker, said bumper being provided with a trip operated by the weight of the sack on the bumper to lock or fix the bumper in position, substantially as specified.

3. In a sack filling and sewing machine, the combination with a sewing device of a movable opening and closing sack-holder, a track for the holder, a sack-filling device or spout, a movable shaker or device for vibrating the holder up and down to shake the sack, and a movable bumper or support to engage the lower end of the sack to settle and compact the contents of the sack in connection with said shaker, and mechanism for raising the shaker provided with a friction-clutch to enable the operator to control the upward movement of the bumper, substantially as specified.

4. The combination with a sack-holder of a sack-filling device or spout, a movable shaker or device for vibrating the holder up and down to shake the sack, and a movable bumper or support to engage the lower end of the sack, substantially as specified.

5. The combination with a sack-holder of a sack-filling device or spout, a movable shaker or device for vibrating the holder up and down to shake the sack, a movable bumper or support to engage the lower end of the sack, and a latch or locking-pin for fixing the bumper in position, substantially as specified.

6. The combination with a sack-holder of a sack-filling device or spout, a movable shaker or device for vibrating the holder up and down to shake the sack, a movable bumper or support to engage the lower end of the sack, a latch or locking-pin for fixing the bumper in position, and a trip on the bumper actuated by the weight of the sack for operating or releasing the locking device, substantially as specified.

7. The combination with a sack-holder of a sack-filling device or spout, a movable shaker or device for vibrating the holder up and down to shake the sack, a movable bumper or support to engage the lower end of the sack, mechanism for operating the shaker, and mechanism for raising the bumper furnished with a friction-clutch, substantially as specified.

8. The combination with a sack-holder of a sack-filling device or spout, a movable shaker or device for vibrating the holder up and down to shake the sack, a movable bumper or support to engage the lower end of the sack, a latch or locking-pin for fixing the bumper in position, a trip on the bumper actuated by the weight of the sack for operating or releasing the locking device, mechanism for operating the shaker, mechanism for operating the bumper, and a friction-clutch connecting the shaker and bumper operating mechanism, substantially as specified.

9. In a sack filling and sewing machine, the combination with a movable opening and closing sack-holder, a track for the holder, a sack-filling device or spout, a sewing device, said track being provided with side guides for keeping the holder closed, and a supplemental short guide or guard for keeping the front portion of the holder closed after emerging from between said guides, substantially as specified.

10. In a sack filling and sewing machine, the combination with a movable opening and closing sack-holder, a track for the holder, a sack-filling device or spout, a sewing device, said track being provided with side guides for keeping the holder closed, and a supplemental short guide or guard for keeping the front portion of the holder closed after emerging from between said guides, the holder being provided with a pin or projection to engage said short guide or guard, substantially as specified.

11. The combination with a movable opening and closing sack-holder and its track, furnished with side guides to keep the holder closed, of a guide or guard to keep the front portion of the holder closed, and a pin or projection on the holder engaging the same, substantially as specified.

12. The combination with an opening and closing sack-holder, of an endless recurring track for the holder, a conveyer, a hook or projection on the holder engaging said conveyer, and a guard for holding said hook or projection in engagement with the conveyer, substantially as specified.

13. The combination with an opening and closing sack-holder, of an endless recurring track for the holder, a conveyer, a hook or projection on the holder engaging said conveyer, and a curved guard extending around the conveyer-pulley at the curved portion of the track for holding said hook or projection in engagement with the conveyer, substantially as specified.

14. The combination with an opening and closing sack-holder, of an endless recurring track for the holder, a conveyer, a hook or projection on the holder engaging said conveyer, and a curved guard extending around the conveyer-pulley at the curved portion of the track for holding said hook or projection in engagement with the conveyer, said holder having also a pin or projection to prevent the holder swinging under the conveyer or its pulley at the curved portion of the track, substantially as specified.

15. In a sack filling and sewing machine, the combination with a movable opening and closing sack-holder, of a sack-filling device, a sewing device, a track for the holder, a slide operated by the holder for setting the sewing mechanism in gear, and a friction-clutch through which motion is communicated to the sewing device to enable it to be started gradually or without shock, said sack-holder having an arm or projecting surface engaging said slide to set the sewing mechanism in motion before the front edge of the sack in the sack-holder reaches the needle, substantially as specified.

16. In a sack filling and sewing machine, the combination with a movable opening and closing sack-holder, of a sack-filling device, a sewing device, a track for the holder, a slide operated by the holder for setting the sewing mechanism in gear, and a friction-clutch through which motion is communicated to the sewing device to enable it to be started gradually or without shock, and a friction-brake for stopping the sewing device to enable its motion to be arrested without shock, said sack-holder having an arm or projecting surface engaging said slide to set the sewing mechanism in motion before the front edge of the sack in the sack-holder reaches the needle, substantially as specified.

17. In a sack filling and sewing machine, the combination with a movable opening and closing sack-holder, of a sack-filling device, a sewing device, a track for the holder, a slide operated by the holder for setting the sewing mechanism in gear, a friction-clutch through which motion is communicated to the sewing device to enable it to be started gradually without shock, and a thread-holder for the free end of the thread or chain provided with a feed device for the thread, substantially as specified.

18. In a sack filling and sewing machine, the combination with a movable opening and closing sack-holder, of a sack-filling device, a sewing device, a track for the holder, a slide operated by the holder for setting the mechanism in gear, a friction-clutch through which motion is communicated to the sewing device to enable it to be started gradually or without shock, a friction-brake for stopping the sewing device to enable its motion to be arrested without shock, and a thread-holder for the free end of the thread or chain provided with a feed device for the thread to feed or take up the thread while the friction-brake is stopping the sewing device, substantially as specified.

19. The combination with a sack-holder, of a sewing mechanism, a thread-holding device for the free end of the thread or chain having a revoluble thread feeding and holding roller, and a coöperating holding surface or jaw and connecting mechanism for operating said roller from the sewing mechanism, substantially as specified.

20. The combination with a sack-holder, of a sewing mechanism, a thread-holding device for the free end of the thread or chain having a revoluble thread feeding and holding roller and a coöperating holding surface or jaw, connecting mechanism for operating said roller from the sewing mechanism, and a friction-clutch through which motion is communicated to the sewing mechanism, substantially as specified.

21. The combination with a sack-holder, of a sewing mechanism, a thread-holding device for the free end of the thread or chain having a revoluble thread feeding and holding roller and a coöperating holding surface or jaw, connecting mechanism for operating said roller from the sewing mechanism, a friction-clutch through which motion is communicated to the sewing mechanism, and a friction-brake for stopping the motion of the sewing mechanism, substantially as specified.

22. The combination with a movable opening and closing sack-holder, a track for the holder, a device for closing the holder, and a stencil-printing device for printing the sack as the holder is closed, substantially as specified.

23. The combination with a sack-filling device, of a sack-holder, a closing device for the holder, a stencil-printing device, and a sewing device, substantially as specified.

24. The combination with a sack-holder, of a stencil-printing device operating to print the sack as it is suspended by the holder, substantially as specified.

25. The combination with a sack-holder, of a stencil mounted upon a reciprocating head or holder, a movable inking-brush, guides for the stencil-carrying head and for the brush, and a reciprocating slide for pressing the stencil against the sack in the holder and operating said brush, substantially as specified.

26. The combination with a sack-holder, of a stencil mounted upon a reciprocating head or holder, a movable inking-brush, guides for the stencil-carrying head and for the brush, a reciprocating slide for pressing the stencil against the sack in the holder and operating said brush, and a device for closing the holder, substantially as specified.

27. The combination with an opening and closing sack-holder, of a reciprocating slide for closing the holder, a treadle for operating said slide, and a chain, pulley, rack and gear for communicating motion from the treadle to said slide, substantially as specified.

28. The combination with a movable opening and closing sack-holder, of a track for the holder, and a hand-operated conveyer-wheel furnished with a pin or projection for engaging a pin or projection on the holder and moving it from the sack-receiving station to the filling position, substantially as specified.

29. The combination with a sewing device and an opening and closing sack-holder furnished with a pin or projection on its front end or portion, of a track for the holder, side guides for keeping the holder closed, and a supplemental short guide or guard adapted to engage said pin or projection on the holder to keep the holder closed at its front end until its rear end emerges from between said side guides, substantially as specified.

30. The combination with a movable or traveling sack-holder of a sewing device, and a friction-clutch through which motion is communicated to the sewing device, and mechanism actuated by the movement of the holder for setting the sewing device in motion before the front edge of the sack in the holder reaches the needle, substantially as specified.

31. The combination with a movable or traveling sack-holder of a sewing device, a friction-clutch through which motion is communicated to the sewing device, and a friction-brake for stopping said sewing device, and mechanism actuated by the movement of the holder for setting the sewing device in motion before the front edge of the sack in the holder reaches the needle, substantially as specified.

32. The combination with a movable sack-holder, of a sewing device, a friction-clutch through which motion is communicated to the sewing device, and connecting mechanism for operating said clutch by the movement of said holder, said connecting mechanism being adapted and arranged to operate said clutch before the front edge of the sack in the holder reaches the needle, substantially as specified.

33. The combination with a movable sack-holder, of a sewing device, a friction-clutch through which motion is communicated to the sewing device, a friction-brake for stopping said sewing device, connecting mechanism for operating said clutch and brake by the movement of said holder, said connecting mechanism being adapted and arranged to operate said clutch before the front edge of the sack in the holder reaches the needle, substantially as specified.

34. The combination with a sack-holder of a sewing device, a friction-clutch through which motion is communicated to the sewing device, and a thread-holder for the free end of the thread or chain furnished with a feed-roller, and a coöperating holding surface or jaw, substantially as specified.

35. The combination with a sack-holder of a sewing device, a friction-clutch through which motion is communicated to the sewing device, a friction-brake for stopping said sewing device, and a thread-holder for the free end of the thread or chain furnished with a feed-roller, and a coöperating holding surface or jaw, substantially as specified.

36. The combination with a sack-holder of a shaker or device for vibrating the holder up and down, and a bumper, substantially as specified.

37. The combination with a sack-holder of a shaker or device for moving the holder up and down, a movable bumper, and mechanism for raising the bumper into position, substantially as specified.

38. The combination with a sack-holder of a shaker or device for moving the holder up and down, a movable bumper, mechanism for raising the bumper into position, and mechanism for locking or fixing the bumper in position, substantially as specified.

39. The combination with a sack-holder of a shaker or device for moving the holder up and down, a movable bumper, mechanism for raising the bumper into position provided with a friction-clutch, and mechanism for locking or fixing the bumper in position, substantially as specified.

40. The combination with a sack-holder of a shaker or device for moving the holder up and down, a movable bumper, mechanism for raising the bumper into position, mechanism for locking or fixing the bumper in position, and a trip on the bumper, substantially as specified.

41. In a sack filling and sewing machine, the combination with a sewing device of a movable opening and closing sack-holder, a track for the holder, a sack-filling device or spout, a movable shaker or device for vibrating the holder up and down to shake the sack, and a movable bumper or support to engage the lower end of the sack to settle and compact the contents of the sack in connection with said shaker, substantially as specified.

ARTHUR T. TIMEWELL.

Witnesses:
H. M. MUNDAY,
L. C. CURTIS.